United States Patent

Tisbo et al.

[11] Patent Number: 5,393,135
[45] Date of Patent: Feb. 28, 1995

[54] COMPACT DISC STORAGE RACK

[75] Inventors: Peter M. Tisbo, Palatine; Cosmo N. Tisbo, Barrington, both of Ill.

[73] Assignee: Custom Plastics, Inc., Elk Grove Village, Ill.

[21] Appl. No.: 77,422

[22] Filed: Jun. 15, 1993

[51] Int. Cl.$^6$ .................................... A47B 81/06
[52] U.S. Cl. ......................... 312/9.48; 206/309; 312/9.57; 312/319.1
[58] Field of Search ............... 312/9.48, 9.47, 319.1, 312/334.44, 9.57; 206/387, 309

[56] References Cited

U.S. PATENT DOCUMENTS

| | | | |
|---|---|---|---|
| 3,180,697 | 4/1965 | Mulch | 312/319.1 |
| 4,257,524 | 3/1981 | Yonkers et al. | 312/9.57 |
| 4,655,345 | 4/1987 | Drake et al. | 206/309 |
| 4,678,245 | 7/1987 | Fouassier | 312/15 |
| 4,819,802 | 4/1989 | Gutierrez | 312/9.57 |
| 4,950,039 | 8/1990 | Helling et al. | 312/9.48 |
| 4,960,205 | 10/1990 | Wang | 206/387 |
| 5,094,516 | 3/1992 | Hunter | 312/319.1 |
| 5,097,946 | 3/1992 | Emrich | 206/45.11 |
| 5,183,177 | 2/1993 | Yu | 206/387 |
| 5,320,244 | 6/1994 | Yu | 206/387 |

FOREIGN PATENT DOCUMENTS 0009754  2/1916  United Kingdom ............... 312/9.48

Primary Examiner—Laurie K. Cranmer
Assistant Examiner—Janet M. Wilkens
Attorney, Agent, or Firm—McHale & Slavin

[57] ABSTRACT

A storage rack for storing compact discs in an orderly manner fashioned from two side rail structures mountable to the inner side surfaces of a container. The rail structures provide horizontal support surfaces for holding the compact disc storage boxes in an organized coplanar position. The inner edge of each rail structure includes a replaceable elastic band that spans from the rail structure for securing the storage boxes and further provide propulsion of the individual boxes upon the simultaneous application of finger pressure and lifting of the individual box allowing ejection to a distance sufficient to permit grasping side edges of the individual box.

6 Claims, 3 Drawing Sheets

COMPACT DISC STORAGE RACK

FIELD OF THE INVENTION

This invention relates generally to storage devices and, more particularly, to support racks for holding compact disc storage boxes and the like in a biased state for ready removal.

BACKGROUND OF THE INVENTION

There are a number of storage boxes on the market employed to protect digital and analog media. Compact discs, audio cassette tapes, video tape cassettes, laser discs, computer disks, and the like objects all require some type of storage box for protection.

The compact disc storage box embodies the state of the art of such storage boxes and for this reason, the following sets forth a description of such art as it relates to one embodiment of the invention. However, it should be noted that by simply changing the dimensions of the instant invention, any object described above can be used with the instant invention and is deemed within the scope of this invention.

Compact discs are readily available to the public for use as read only memory devices for computer systems (CD-ROM) and, more abundantly, as a substitute for conventional phono-records. The compact disc (CD) revolutionized the music industry by nearly eliminating conventional phono records within 5 years of commercial introduction. Compact discs are known to provide high quality sound reproduction unmatched by electromechanical phono-recording. Additional benefits are based upon the relatively thin structure of the compact disc with a diameter of less than 5 inches. The surface of the compact disc is a durable coating covering a photo-sensitive material that can be interpreted through the coating by laser beam modulation.

Compact discs are commercially packaged in plastic enclosures to prevent damage during shipping and/or storage. To this end the industry has adopted, and the consumer has accepted, a thin planar compact disc storage box as the industry standard for protecting the disc from dust, dirt, scratches, fingerprints, and the like damaging elements. The compact disc storage box is a hard plastic case having a hinged cover with an internal support base which clamps the disc in a secured position. However, while compact disc storage boxes store the individual discs, stacking the storage boxes creates an unmanageable pile that is difficult to maintain or procure a particular selection. For instance, if twenty compact disc storage boxes are placed in a stacked position, the removal of a single storage box near the bottom of a pile will cause the remainder of the pile to tip over or fall out of alignment.

Conventional compact disc storage boxes do not interlock so a typical device used for maintaining the storage boxes in alignment is a cabinet having at least two tightly fitting sides and a back wall. However, placement of compact disc storage boxes within such a cabinet makes removal difficult if the sides of the storage box cannot be grasped.

For this reason, a variety of storage containers are now available presenting various devices to allow ease of access to the compact disc storage box while maintaining some form of order to an accumulation. U.S. Pat. No. 5,097,946 issued to Emrich discloses a cabinet for compact disc storage boxes using a plurality of sleds. U.S. Pat. No. 4,960,205 issued to Wang discloses a storage device in which compact disc storage boxes are slid in and out of a cabinet employing vertical slots. U.S. Pat. No. 4,655,345 issued to Drake et al., discloses a storage device in which compact disc storage boxes are slid in and out of a cabinet using horizontal slots. U.S. Pat. No. 4,678,245 issued to Fouassier discloses a spring biased device in which compact disc storage boxes are slid in and out of a cabinet on horizontal rails. Fouassier utilizes an integrated latch means incorporated into a side wall in combination with individual spring assembles for release of a stored box.

Still other devices are known to exist that use various types of springs such as molded plastic spring tabs to maintain the compact disc storage box in a biased position wherein removal is assisted by use of the spring tab. However, besides the costly manufacture and assembly of current devices, a problem with conventional spring biased compact disc storage containers becomes apparent upon improper insertion of a compact disc storage box, i.e. pushing the storage box too far into the container. The result is irreparable damage to the biasing portion of the device. Further, the use of molded plastic biasing springs have limited life and eventually lead to poor operating characteristics, and since damaged plastic molded springs cannot be replaced, portions of the storage device will become inoperable.

Thus, the problem to which the instant invention is directed is based upon the need for a low cost storage device capable of orderly stacking compact disc storage boxes within an existing cabinet using a biasing means that is inexpensive and easily replaced if damaged. While efforts have been made toward effectively and simply resolving these problems, no satisfactory solution has heretofore been provided. It is, therefore, to the effective resolution of these problems that the present invention is directed.

SUMMARY OF THE INVENTION

The principle object of the present invention is to provide a simple and inexpensive device for storing a plurality of objects such as compact disc storage boxes which overcomes the difficulties previously mentioned by use of a device that requires minimal space, provides a means for positioning the compact disc storage box in a secure position, and has a replaceable biasing means that permits the object to be removed from a storage slot by finger pressure.

The instant invention accomplishes these goals by use of two side rails available for mounting in an existing cabinet. Each side rail is formed from a single piece of molded plastic material having a height and a length, a first side surface forming a mounting face, and a frontal surface having a plurality of parallelly spaced apart shelf flanges to provide a support surface for the object hereinafter referred to as the compact disc storage boxes. The support surface is comprised of the top of the shelf flanges which are disposed perpendicularly to the frontal surface and extend substantially along the length of each side rail. At one end of each shelf flange is an upwardly facing front tab for holding the compact disc storage box within the support surface. At the distal end of each side rail is a backing tab for use with a replaceable elastic band for biasing the compact disc storage box against the front tab and, more importantly, for use in removal of the storage box.

Insertion of a compact disc storage box onto the side rails depresses the elastic band between spaced apart backing tabs which in turn biases the box in a secure position against the appropriate front tab. Thus the compact disc storage box is maintained in an orderly coplanar position. Removal of a compact disc storage box requires the storage box to be pushed inwardly and slightly upward wherein the elastic band biases against the spaced apart backing tabs and propels the storage box out of the front of the side rails to allow ease of grasping. The elastic band can be made of any material capable of reciprocating a force and the type of elastic material used determines whether the compact disc storage box is propelled gingerly or forcefully. An elastic band is placed on each side rail for symmetry and includes T-shaped ends which permit simplistic replacement if excessive or improper operation of the device takes place. Replacement of the elastic band permits total replacement of the biasing means without need of replacing the entire device.

Thus an objective of the instant invention is to provide inexpensive storage racks for attachment to the inner walls of a cabinet for the orderly stacking of compact disc storage boxes.

Still another object of the instant invention is to provide a replaceable elastic band for biasing compact disc storage boxes for ready removal by pressing against the exposed portion of the stored box.

Yet another object of the instant invention is to provide storage racks that are narrow in width to provide orderly stacking yet permit back to back attachment for multiple tier housings.

A further objective of the instant invention is to provide a storage device made from a low number of distinct pieces achieving a low manufacturing cost and providing ease of assembly for the end user.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
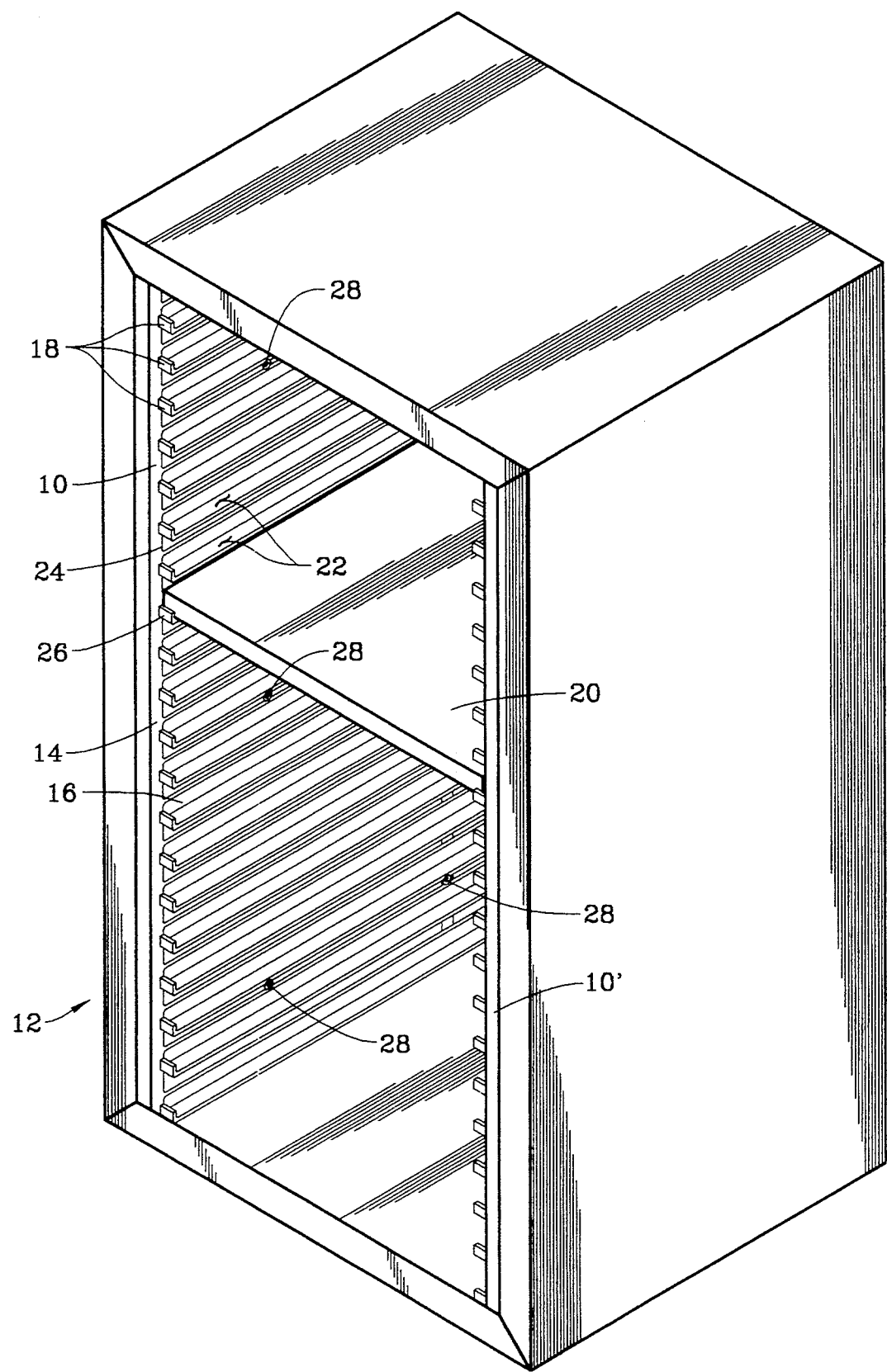
FIG. 1 is a perspective view showing the instant invention installed into a cabinet with a compact disc storage box stored therein.

Now referring to FIG. 1, shown is a perspective view of the instant invention wherein a portion of first side rail structure 10 and second side rail structure 10' are shown mounted to the inner side surfaces of a cabinet 12. It is noted for all purposes herein, the side rail structures 10 and 10' form mirror images in both shape and function. Side rail structure 10 is defined by plate 14 having a frontal face 16 and a mounting surface, described in part later in this specification. The frontal face 16 has a plurality of parallelly spaced apart shelf flanges 18 projecting outwardly from the frontal face 16 to support an object such as a compact disc storage box 20. Each shelf flange 18 provides a narrow traverse support member 22 along the length of the shelf flange 18 which supports the opposite side edges of the compact disc storage box 20. At the front of the shelf flange 18 is a tab 26 for use in securely holding the compact disc storage box 20 in position when the box 20 is positioned upon the support surface 22.

The storage cabinet 12 illustrated is for example purposes only and can be any rectilinear structure made of wood, plastic, or the like suitable material capable of separating the side rail structures 10 and 10' at a fixed distance according to compact disc storage box dimensions. The side rail structure 10 includes a plurality of through holes 28 for securing the side rail to the inner wall of the cabinet 12 by use of screws, nails and the like fastening devices. Multiple storage rows can be extrapolated from the instant invention by coupling side rail mounting surfaces in a back to back format using the through holes 28 for attachment and securing the side rails at the top and bottom wall of the storage container.

Figure 2:
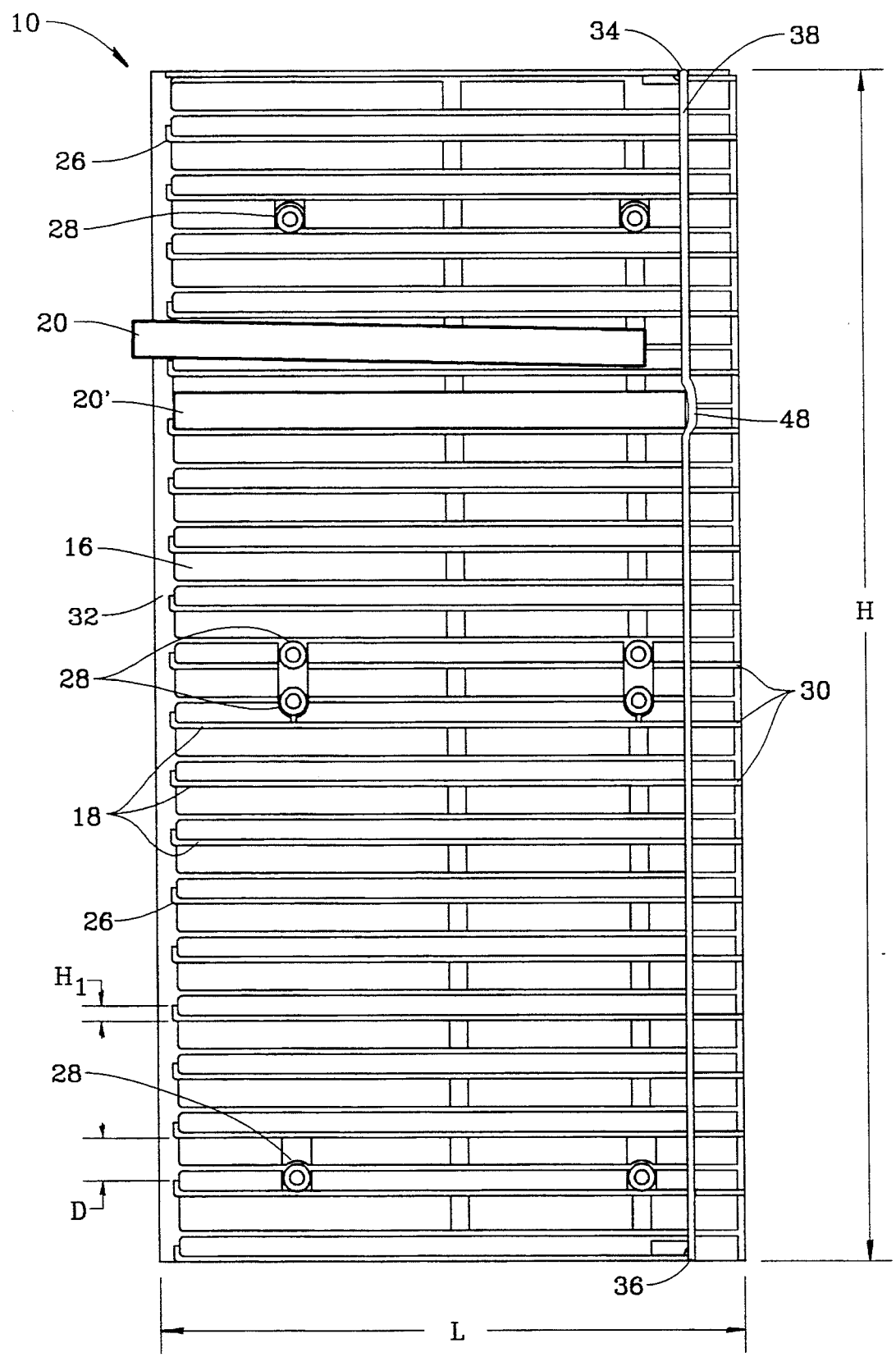
FIG. 2 is a side view of a single side rail with compact disc storage boxes shown in both a stored and released position.

FIG. 2 sets forth the side rail structure 10 of the instant invention in a stand alone view. The side rail structure 10 is formed from a single piece of molded plastic having a height H sized or trimmed accordingly to meet the height of the cabinet to be fitted. The overall length L of the side rail 10 is approximately 160 mm or slightly larger than the conventional compact disc storage box 20 allowing room for the front tab 26 and a backing tab 30. A leading portion 32 of the frontal face 16 extends beyond the front tab 26 and is beveled to assist alignment during insertion. The side rail structure 10 sets forth the frontal face 16 from which the spaced apart shelf flanges 18 are formed in a coplanar manner along the height H of the frontal surface 16. Each shelf flange 18 includes the upwardly projecting front tab 26 which is perpendicular to the support member 22. The front tab 26 operates as a retaining means segment and has a height H1 of approximately one quarter the width of the compact disc storage box 20 providing an exposed lip of between 1 mm and 2 mm sufficient to hold the compact disc storage box 20 within the shelf flange 18. The preferred distance D between the shelf flanges 18 as defined by the front tab entrance spacing is approximately 13 mm to allow ease of box 20 insertion and removal.

The biasing portion of side rail 10 incorporates top slot 34 to permit placement of one end of an elastic band 38 to the mounting surface directly behind the top slot 34 and a second end of elastic band 38 to a place of securement directly behind the bottom slot 36. Upon engagement with slots and securement to the mounting surface, the elastic band 38 biases against each backing tab 30 located on the distal end of each shelf flange 18 whereby insertion of a compact disc storage box 20' between the front tabs 16 presses against the elastic band 38 causing a frictional engagement between backing tabs 30 located above and below the compact disc storage box 20'. Once inserted, the compact disc storage box 20' is biased against the inner surface of the front tab 26 securing the compact disc storage box 20' in a substantially coplanar position with the shelf flanges 18 along the shelf surface 22.

More important to the biasing of the compact disc storage box 20' against the tab 26 during storage is that the elastic band 38 assists in removal of the box 20' when the box is urged to overcome the biasing and by a slight upward movement to permit ejection from the shelf flange 18. The compact disc storage box 20' is then slid over the tab 26 a sufficient distance to allow grasping of the side edges of the box 20. The elastic band 38 is permanently secured to side rail 10 upon attaching the side rail 10 to a cabinet wall by use of through holes 28 receptive to screws, nails, and the like. By use of a replaceable elastic band, excessive use of the device will not harm overall operation for replacement of the elastic band will restore operation of the device to its original specification.

Figure 3:
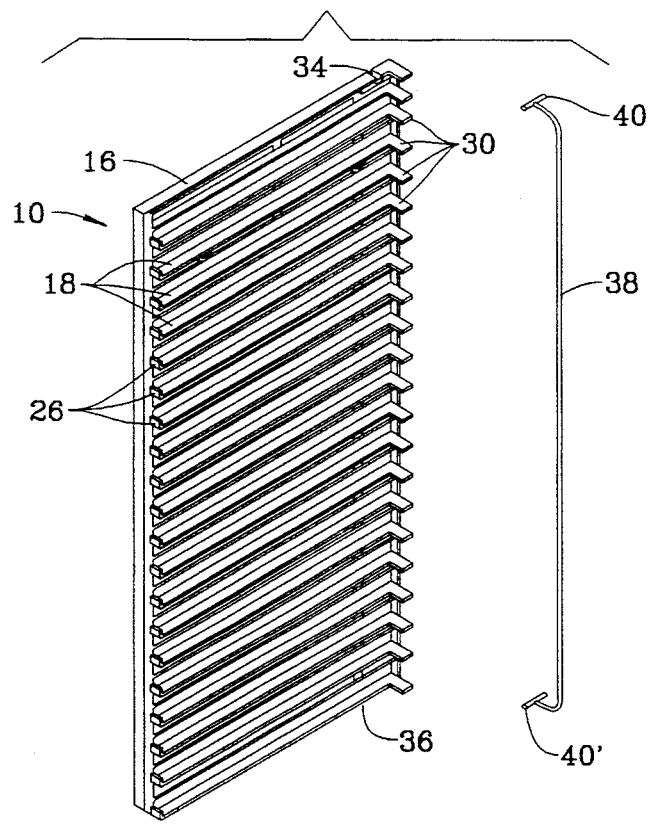
FIG. 3 is an exploded perspective view of a single side rail with the replaceable elastic band available for attachment.
Figure 4:
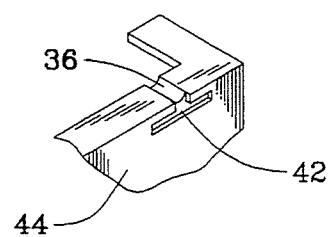
FIG. 4 is a partial back view of the side rail depicted in FIG. 3.

Now referring to FIGS. 3 and 4, shown is an exploded perspective view of the side rail 10 wherein the backing tabs 30 are clearly shown together with the elastic band 38. The backing tabs 30 extend outwardly from the frontal face 16 a distance slightly larger than that of the shelf flanges 18. The purpose for the enlarged backing tabs 30 is to provide support for the elastic band 38 when pressed into service by insertion of a compact disc storage box. The elastic band 38 is locked to the device by means of bifurcated tangent ends 40 and 40' which are T-shaped for insertion into T-shaped mortise receptacles, the illustrated bottom receptacle 42 is located on the mounting surface 44 of the side rail 10. The receptacle 42 allows the bifurcated tangent end 40' to fit within the receptacle 42 thereby allowing flush attachment to a wall. Upon attachment, the ends 40 and 40' are locked in position and cannot be removed until the side rail 10 is detached from the wall.

The use of the elastic band 38 provides uniformity of biasing as the edges of the band 48 frictionally engage each individual back tab 30 when the compact disc storage box is inserted. The elastic band 38 effectively provides a finger pressure removal of the compact disc storage box wherein the pushing of the box away from the tab 26 and subsequent releasing of the finger pressure allows the box to "pop out" to a position where the box can be easily grasped.

Replacement of the elastic band 38 is performed by removing the side rail 10 from the wall and lifting the T-shaped ends from the receptacle. Insertion of a new elastic band requires placement of the T-shaped ends into the respective receptacles and reattachment of the side rail 10 to the cabinet wall thus locking the T-shaped ends into position.

Figure 5:
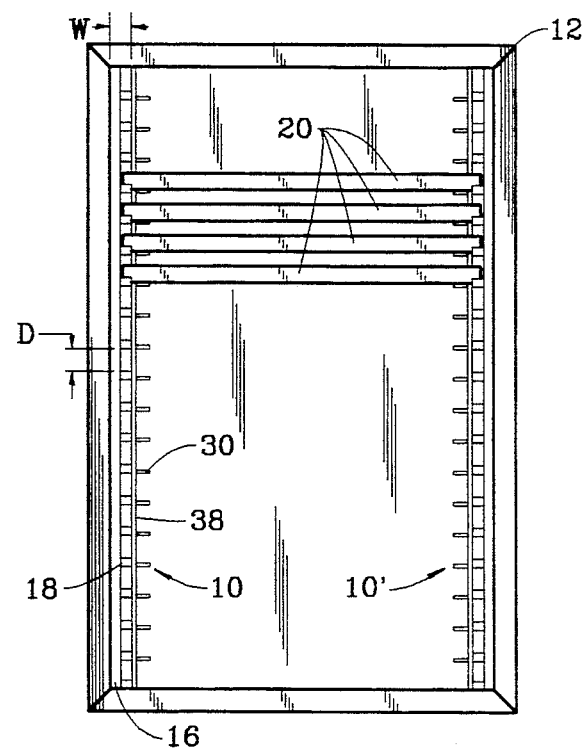
FIG. 5 is a front view of the instant invention install in a cabinet.

FIG. 5 is a front view of the storage container 12 having side rails 10 & 10' placed on either inner side surface of the cabinet 12. The width W of the side rail 10, comprising the frontal face 16 and shelf flange 18, is approximately 8 mm, not including the back stop 30 which projects inwardly approximately an additional 10 mm. To provide a dense stacking of compact disc storage boxes, the distance D between the tabs 26 is approximately 13 mm which provides sufficient insertion space while assisting in disc alignment. The invention provides for orderly stacking of the compact disc storage boxes 20 at a fixed distance to prevent scratching of the boxes 20, allows for easier viewing of box titles, and permits touch removal of any box 20 without interfering with the remaining stored boxes. It can be observed from the above that the storage of the compact disc storage boxes is very simple and the use of the elastic band provides a reliable and inexpensive manufacture. Further, the use of a replaceable band having a means for locking the band to the device constitutes an unexpected and unobvious improvement over the prior art.

It is to be understood that while we have illustrated and described certain forms of the invention, it is not to be limited to the specific forms or arrangement of parts herein described and shown. It is noted that the basic function of the racks can be utilized for storage of other boxes such as audio cassette tapes, video tape cassettes, laser discs, computer disks, and so forth by simply changing the dimensions of the instant invention and are thus deemed within the scope of this invention.

What is claimed is:

1. A device for storing a plurality of objects such as compact disc storage boxes comprising:
   a first side rail structure formed from a single piece of material having a height and a length defined by a mounting surface and a frontal face, a plurality of parallelly spaced apart shelf flanges projecting outwardly from said frontal face to a predetermined width which is substantially less than a corresponding width of an object to be stored, each said shelf flange having an upwardly projecting tab disposed on a front edge formed perpendicular and integral to said shelf flange; at least one elastic band releasably coupled along a distal end of said side rail structure for biasing said object to be stored against said projecting tabs; a means for locking a portion of said elastic band to said side rail; a means for securing said mounting surface to an inner surface of a storage housing; and a second side rail structure forming a mirror image of said first side rail structure; whereby the mounting surfaces of said first and second side rail structure are available for securing to the opposing inner surfaces of a cabinet allowing insertion of an object to be stored onto opposing shelf flanges for biasing against said projecting tabs thus securing said object to be stored in a substantially co-planar position with said shelf flanges wherein removal of a stored object is performed by upwardly urging said object to overcome said biasing and said projecting tabs allowing removal from said shelf flanges.

2. The device for storing a plurality of objects according to claim 1 wherein said elastic band includes a bifurcated tangent end operatively associated with said locking means.

3. The device for storing a plurality of objects according to claim 1 wherein said locking means is defined as a first and second T-shaped mortise located along said mounting surface of said side rails receptive to securing one end of said elastic band in said first mortise and a second end of said elastic band in said second mortise.

4. The device for storing a plurality of objects according to claim 1 wherein said elastic band includes a backing tab located near a distal end of each said shelf flange.

5. The device for storing a plurality of objects according to claim 1 wherein each said side rail structure is sized for installation in a cabinet interior.

6. A device for storing a plurality of compact disc storage boxes comprising:

a first side rail structure formed from a single piece of molded plastic having a height and a length defined by a mounting surface and a frontal face, a plurality of parallelly spaced apart shelf flanges project outwardly from said frontal face to a predetermined width which is substantially less than a corresponding width of a compact disc storage box, each said shelf flange having an upwardly projecting perpendicular placed front tab disposed on one end and a backing tab disposed on a distal end of each said shelf flange formed integral to said shelf flange; a single piece elastic band releasably coupled to a distal end of each said side rail structure operatively associated with said backing tab for biasing a compact disc storage box against said front tabs, said elastic band having bifurcated tangent ends; T-shaped mortises operatively associated with said tangent ends; a means for securing said mounting surface to an inner surface of a cabinet and locking said tangent ends in said mortises; and a second side rail structure forming a mirror image of said first side rail structure; whereby the tangent ends of said elastic band are placed within said T-shaped mortises and the mounting surfaces of said first and second side rail structure are secured to the opposing inner surfaces of a cabinet locking said elastic band along the distal end of each shelf flange allowing insertion of a compact disc storage box onto opposing shelf flanges for biasing against said front tab securing said compact disc storage box in a substantially co-planar position with said shelf flanges, wherein removal of said compact disc storage box is performed by upwardly urging of said compact disc storage box to overcome said biasing and said front tab allowing removal from said shelf flanges.

* * * * *